US011041266B2

United States Patent
Onishi et al.

(10) Patent No.: US 11,041,266 B2
(45) Date of Patent: Jun. 22, 2021

(54) WASHING MACHINE (71) Applicants: Qingdao Haier Washing Machine Co., Ltd., Shandong (CN); Aqua Co., Ltd., Tokyo (JP)

(72) Inventors: Takashi Onishi, Tokyo (JP); Yoshikazu Bamba, Tokyo (JP); Takaaki Yonezawa, Tokyo (JP); Katsumi Oe, Tokyo (JP)

(73) Assignees: QINGDAO HAIER WASHING MACHINE CO., LTD., Shandong (CN); AQUA CO., LTD., Tokyo (JP)

( * ) Notice: Subject to any disclaimer, the term of this patent is extended or adjusted under 35 U.S.C. 154(b) by 779 days.

(21) Appl. No.: 15/752,015

(22) PCT Filed: Aug. 17, 2016

(86) PCT No.: PCT/CN2016/095718
§ 371 (c)(1),
(2) Date: Feb. 12, 2018

(87) PCT Pub. No.: WO2017/028790
PCT Pub. Date: Feb. 23, 2017

(65) Prior Publication Data
US 2018/0230636 A1 Aug. 16, 2018

(30) Foreign Application Priority Data
Aug. 17, 2015 (JP) .............................. JP2015-160650

(51) Int. Cl.
*D06F 37/38* (2006.01)
*F16H 55/52* (2006.01)
(Continued)

(52) U.S. Cl.
CPC .............. *D06F 37/38* (2013.01); *D06F 37/36* (2013.01); *F16H 9/18* (2013.01); *F16H 55/52* (2013.01);
(Continued)

(58) Field of Classification Search
None
See application file for complete search history.

(56) References Cited

FOREIGN PATENT DOCUMENTS

| AT | 368260 B | 9/1982 |
|---|---|---|
| CN | 1952250 A | 4/2007 |

(Continued)

OTHER PUBLICATIONS

Supplementary European Search Report from related European Application No. 16836654.0, dated Mar. 8, 2019 (9 pages).

*Primary Examiner* — Rita P Adhlakha
(74) *Attorney, Agent, or Firm* — Burns & Levinson, LLP; Joseph M. Maraia (57) ABSTRACT

A washing machine is provided. The washing machine includes an input shaft, configured to supply a rotary power to a rotation part for rotating washings; a motor, configured to rotate in a forward and backward direction and served as a power source of the rotation part; a transmission arranged between an output shaft of the motor and the input shaft of the rotation part. The transmission includes a transformable driving side pulley unit disposed on the output shaft; a transformable driven side pulley unit disposed on the input shaft; a driving belt for transferring power between the pulley unit. The driving side pulley unit/driven side pulley unit is directly installed on the output shaft/input shaft by locating each end of the output shaft/input shaft at a movable pulley and a fixed pulley respectively, so that the driving side pulley unit/driven side pulley unit rotates integrally with the output shaft/input shaft.

8 Claims, 7 Drawing Sheets

(51) Int. Cl.
*D06F 37/36* (2006.01)
*F16H 9/18* (2006.01)
*F16H 55/56* (2006.01)
*D06F 37/30* (2020.01)

(52) U.S. Cl.
CPC ......... *F16H 55/563* (2013.01); *D06F 37/306* (2013.01); *D06F 2202/12* (2013.01); *D06F 2204/065* (2013.01); *D06F 2212/02* (2013.01); *D06F 2220/00* (2013.01)

(56) References Cited

FOREIGN PATENT DOCUMENTS

| | | |
|---|---|---|
| EP | 0384149 B1 | 9/1993 |
| EP | 3333304 A1 | 6/2018 |
| GB | 1079978 | 8/1967 |
| GB | 1393134 A | 5/1975 |
| GB | 2027139 A | 2/1980 |
| JP | S5356455 A | 5/1978 |
| JP | 2008012088 A | 1/2008 |

WASHING MACHINE

CROSS REFERENCE TO RELATED APPLICATIONS

This application is the U.S. national phase entry under 35 U.S.C. § 371 of International Application No. PCT/CN2016/095718, filed Aug. 17, 2016, entitled WASHING MACHINE, which claims priority to Japanese Patent Application No. 2015-160650, filed Aug. 17, 2015, the contents of which are incorporated herein by reference in their entirety for all purposes.

TECHNICAL FIELD

The present disclosure relates to a washing machine capable of dealing with noises and abnormal sounds generated by a transmission properly when the transmission is added for efficient operation of a motor.

BACKGROUND

In the past, a cheap induction motor is generally used in the washing machine. The induction motor is an alternating current (AC) motor. In the induction motor, an induced current is generated in a rotor by a rotating magnetic field established by a coil passing through the alternating current, and the motor is driven by an interaction between a magnetic field generated by the induced current and the rotating magnetic field. In general, a rotary power generated on an output shaft of such a motor is transmitted to an input shaft of a rotation part such as a stirring wing, a dewatering drum or the like via a pair of pulleys, a driving belt and a decelerator (see Patent Document 1).

On the other hand, a member controlled in a frequency conversion mode is also used in the washing machine by users. The frequency conversion control is a control method in which the alternating current is converted into the direct current to be further converted into alternating current of an arbitrary frequency so as to drive the motor (see Patent Literature 2).

However, regarding the manner of the induction motor, since a pulley diameter ratio is constant, the start-up of the motor is slow, and more operations run in the low rotation region with low efficiency. In addition, especially for a washing machine that switches rotations in a forward direction and a backward direction while performing a washing process and a rinsing process, a property of the start-up time has a great influence, and thus, a problem of poor efficiency cannot be solved.

On the other hand, although the washing machine with the frequency conversion mode can be set at a frequency at which the washing machine operates at high efficiency, there is a problem of high cost due to a complicated control system.

To solve such problems, a transmission is considered to be used. When the transmission is used, the induction motor can quickly pass through the inefficient start-up period of the motor and move to an efficient high-rotation region.

As such a transmission, a transmission in a manner of a so-called V-type driving belt generally used in an electric vehicle and the like is relatively simple. Such a transmission is constituted by connecting a driving side pulley unit and a driven side pulley unit via the driving belt. In addition, the transmission can be mounted by mounting a driven side pulley unit on an input shaft for supplying rotary power to a rotation part that drives the washing machine and mounting a driving side pulley unit on an output shaft that rotates in the forward and backward directions and forms the power source of the rotation part.

However, for mounting such pulley units, shafts need to be added to the input shaft and the output shaft so that a distance from a point of action to a fulcrum in each shaft is increased. Therefore, the shafts are easily broken, and no matter how the added part of the shafts is fixed stably, a tension is still applied from the driving belt, thereby inevitably generating noises and abnormal sounds. In particular, since a square effect occurred on the stress and a cubic effect occurred on the curvature with respect to the length of the shaft, it is desirable to minimize the length of the shafts.

In addition, since the washing machine rotates in the forward and backward directions repeatedly, it is expected for the transmission itself that the impact sound of a weight roller for rotation speed sensation, the slipping sound between the driving belt and the pulley and the like will generate greater influences beyond general uses.

RELATED TECHNICAL LITERATURES

Patent Literatures

Patent Literature 1: Japanese Laid-Open Patent Publication No. 2002-166089
Patent Literature 2: Japanese Laid-Open Patent Publication No. 04-322696

SUMMARY

Problems to be Solved

The present disclosure aims to provide a washing machine capable of solving these problems effectively in which a transmission is suitably incorporated.

Solutions for Solving the Problem

In order to achieve the above object, the present disclosure adopts the following technical solution.

That is, the washing machine of the present disclosure includes: an input shaft, configured to supply a rotary power to a rotation part for rotating washings; a motor, configured to rotate in a forward direction and a backward direction and served as a power source of the rotation part; and a transmission arranged between an output shaft of the motor and the input shaft of the rotation part. The transmission includes a transformable driving side pulley unit disposed on the output shaft; a transformable driven side pulley unit disposed on the input shaft; and a driving belt for transferring power between the driving side pulley unit and the driven side pulley unit. The driving side pulley unit is directly installed on the output shaft by locating each end of the output shaft at a movable pulley and a fixed pulley constituting the driving side pulley unit respectively, so that the driving side pulley unit rotates integrally with the output shaft, and the driven side pulley unit is directly installed on the input shaft by locating each end of the input shaft at a movable pulley and a fixed pulley constituting the driven side pulley unit respectively, so that the driven side pulley unit rotates integrally with the input shaft.

At this time, preferably, at least one of the driving side pulley unit and the driven side pulley unit includes an outer pulley hub rotating integrally with the movable pulley, an inner pulley hub rotating integrally with the fixed pulley, and a cam mechanism formed between the outer pulley hub and the inner pulley hub. The inner pulley hub is formed to have a bottom, and the end of the shaft penetrating through the bottom and the inner pulley hub are fastened to an inner surface of the bottom.

The transmission includes a rotation speed sensing part configured to change a pulley diameter ratio according to a rotation speed of the output shaft or the input shaft. The rotation speed sensing part includes: a movable weight that moves from a radially inner side position to a radially outer side position due to a centrifugal force; and an inclined surface provided on a side of the movable pulley. The inclined surface is configured to convert a displacement of the movable weight into an axial displacement of the movable pulley, and a buffer member for cushioning an impact generated when the movable weight collides with the inclined surface is provided at a radially inner side position or a radially outer side position of the inclined surface.

Particularly, after the movable weight shifts due to the centrifugal force, the movable pulley located at a side where no movable weight is provided compresses a spring as the movable pulley shifts in an axial direction, and the buffer member is provided at least at the radially inner side position of the inclined surface to cushion an impact when the movable weight returns.

Besides, to reduce the sliding sounds of the driving belt, a control part for driving the motor via a driver is preferably configured to, by taking a preset specified driving time during which the rotation part is driven and a specified inertial rotation time until the rotation part stops as working units, drive the rotation part in the backward direction repeatedly on the basis of each of the working units.

Effect of the Disclosure

According to the present disclosure described above, a pulley unit can be installed without adding shafts to the input shaft and the output shaft. Therefore, the enlargement of the shaft due to an increase in the size of the shaft is effectively avoided, thereby avoiding the occurrences of harsh noise, abnormal noises and the fragility of the shaft.

According to a mounting structure of the present disclosure, a cam mechanism is disposed between the pulley hubs and the inner surface of the bottom of the pulley hub is used, thus the outer pulley hub and an inner pulley hub can be installed without adding a shaft. Therefore, the lengthening of the shaft is avoided.

According to the present disclosure, a rotation speed sensing part is provided and a buffer member for cushioning an impact from the movable weight is disposed. Therefore, even if the radial displacement of the movable weight occurs frequently, the noises and the abnormal sounds generated when the movable weights collide can be prevented effectively.

In particular, according to the present disclosure in which the buffer member is provided at the radially inner side position in the case where the spring is used for the return of the movable weight, the relatively large impact sounds generated when the assisting force of the spring force is exerted on the movable weight can be effectively prevented.

According to the present disclosure, the motor is controlled to rotate in the backward direction after it stops, thus the noises and the abnormal noises, generated in the case that the motor rotates in the backward direction during the inertia rotation, due to the sliding friction between the driving belt and the pulley can be minimized.

LIST OF REFERENCE NUMERALS

8: Transmission; 72: Motor; 72$m$: Output shaft; 72$m$1: Threaded hole; 80: Rotation part; 80$m$: Input shaft; 81: Driving side pulley unit; 81$c$: Rotation speed sensing part; 81$c$2: Movable weight (weight roller); 81$c$3: Inclined surface; 81$c$4: Inclined surface; 81$e$: Buffer member (gasket); 82: Driven side pulley unit; 82$c$: Spring; 82$d$: Inner pulley hub; 82$e$: Outer pulley hub; 82$f$: Cam mechanism; 83: Driving belt; 91: Control part; 92: Driver; T1, T3: Driving time; T2,T4: Inertia rotation time

DETAILED DESCRIPTION

The first embodiment of the present disclosure will be described below in combination with drawings.

Figure 1:
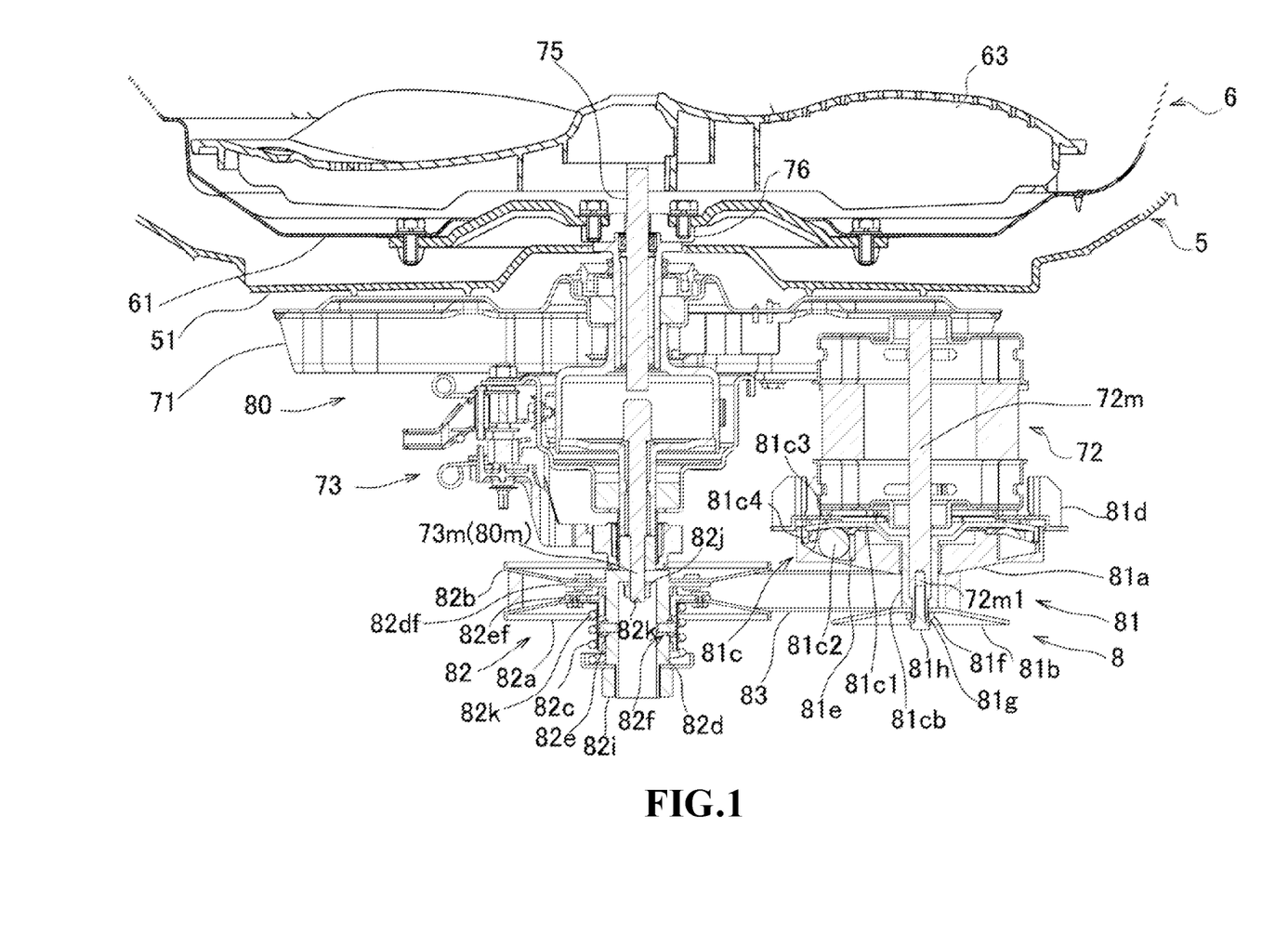
FIG. 1 is a partial longitudinal section view illustrating a principal part of a washing machine according to an embodiment of the present disclosure in a state where a transmission is started.
Figure 2:
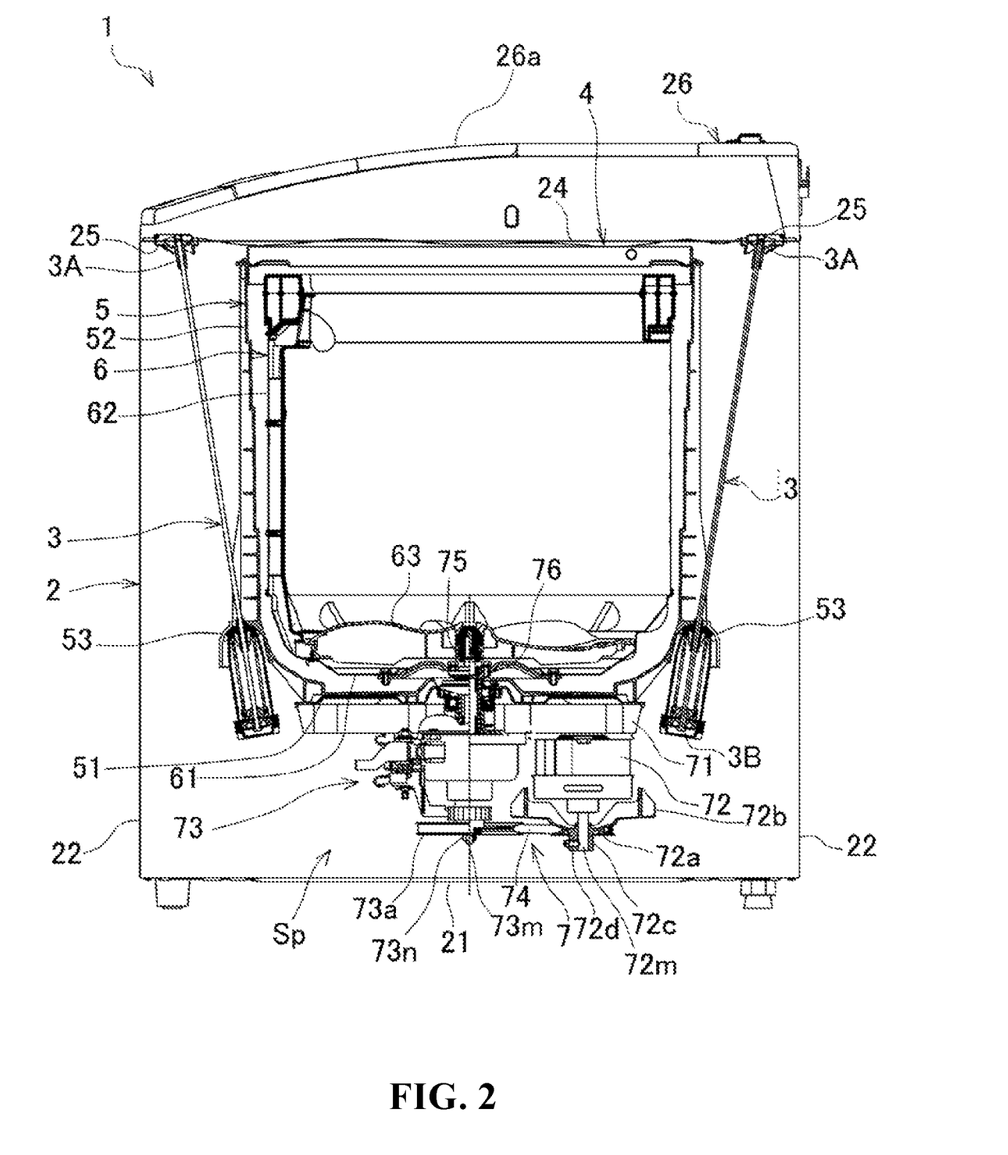
FIG. 2 is an overall section view illustrating a general structure of a washing machine with no transmission compared with this embodiment.

FIG. 1 is a partial longitudinal section view illustrating a washing machine utilizing a transmission 8 according to an embodiment of the present disclosure, and FIG. 2 is overall longitudinal section view illustrating a washing machine 1 that does not utilize such a transmission.

Firstly, a basic structure of the washing machine 1 shown in FIG. 2 is described. On the basis of the basic structure, a washing machine equipped with the transmission 8 according to the present embodiment is described.

The washing machine 1 is a so-called vertical washing machine including a housing 2 and a washing drum unit 4 in the housing 2. The washing drum unit 4 is suspended and supported by a suspension bar 3, and includes a bottomed outer drum 5 in a substantially cylindrical shape, a bottomed inner drum 6 in a substantially cylindrical shape that is coaxially disposed inside the outer drum, and a driving mechanism 7 arranged on the bottom of the outer drum 5.

The housing 2 is formed by a substantially rectangular bottom surface 21 and four wall surfaces 22 erected from the bottom surface 21, and is configured to be in a box shape with an inner space Sp opened upward. At each of four corners near an upper end 24 of the housing 2, a hook-shaped suspension fixing part 25 is provided. The suspension fixing part 25 is served as a fulcrum for suspending the suspension bar 3 by hanging and fixing a base end 3A of the suspension bar 3.

A hood 26 integrated with an operation panel is provided on the upper part of the housing 2. A part of the hood 26 is configured as an opening/closing cover 26a through which the inner space Sp is opened and closed like operating a folding door.

The outer drum 5 constituting the washing drum unit 4 is a bottomed, substantially cylindrical member, and includes: a bottom plate 51 forming the bottom, which is substantially circular when viewed from the top; and a peripheral wall 52 erected from an edge of the bottom plate 51. At the lower part of the peripheral wall 52, a hook-shaped suspended support part 53 is integrally provided at each of four positions in a nearly equal manner when viewed from the top. The suspended support part 53 can be attached to a top end 3B of the suspension bar 3.

The inner drum 6 constitutes a so-called washing and dewatering drum, and is formed as a bottomed cylindrical shape. Besides, the inner drum 6 includes a bottom plate 61 that is substantially circular when viewed from the top and a peripheral wall 62 erected from an edge of the bottom plate 61. The inner drum 6 is arranged coaxially with the outer drum 5 inside the outer drum 5, and is supported by the outer drum 5 via a driving mechanism 7 so that the inner drum 6 is rotatable. A large number of limbers (not shown) are provided in the bottom plate 61 and the peripheral wall 62, and water in the inner drum 6 can be discharged through the limbers. In addition, a stirring wing 63, generally referred to as a pulsator, is coaxially provided over the bottom plate 61 of the inner drum 6.

The driving mechanism 7 includes a base member 71 mounted on the lower surface of the bottom plate 51 of the outer drum 5, a motor 72 provided on the base member 71, and a power distributing part 73 having a clutch. The motor 72 is an induction motor. An output shaft 72m of the motor 72 and an input shaft 73m of the power distributing part 73 is equipped with fixed pulleys 72a and 73a, respectively, and a flat driving belt 74 is wound around these fixed pulleys 72a and 73a so that power can be mutually transmitted to one another.

The power distributing part 73 is configured to distribute the rotary power input to the input shaft 73m to two input shafts 75 and 76 arranged coaxially via the clutch, so that the inner first input shaft 75 is connected to the center of the stirring wing 63 and the outer second input shaft 76 is connected to the bottom plate 61 of the inner drum 6. In response to a command from a control part, the power distributing part 73 supplies the rotary power of the induction motor 72 to the input shaft 73m via the fixed pulley 72a, the driving belt 74 and the fixed pulley 73a, so that the rotary power is selectively switched to the first input shaft 75 or to both the first input shaft 75 and the second input shaft 76. Thus, only the stirring wing 63 rotates in the washing machine 1 during a washing process, while the inner drum 6 and the stirring wing 63 integrally rotate during a dewatering process.

In the present embodiment, in such a structure, a transmission 8 shown in FIG. 1 is interposed in the power transferring part between the output shaft 72m of the motor 72 and an input shaft 80m of a rotation part 80 (i.e., the input shaft 73m of the power distributing part 73). The same reference numerals are used to represent parts of FIG. 1 that are common to FIG. 2. The rotation part 80 of the present embodiment is equivalent to the stirring wing 63 in a washing process and a rinsing process, and is equivalent to the stirring wing 63 and the inner drum 6 in a dewatering process.

The transmission 8 is adopted to improve the characteristics of the motor 72. As for the induction motor 72 of the present embodiment, since pulley diameter ratios of the fixed pulleys 72a and 73a are always constant and an effective torque first appears in the high rotation region, the start-up is slow, and more operations occur in the low rotation region where the rush current is large. In addition, especially for the washing machine 1 which performs the washing process and the rinsing process while switching the rotation in the forward and backward directions, a poor start-up characteristic greatly affects the whole process.

Therefore, when the transmission 8 is interposed, the reduction gear ratio is shifted along with the start-up. Even if the starting characteristic of the motor 72 is constant, the torque applied on the input shaft 80m (73m) at the driven side is multiplicative in the inefficient low rotation region of the motor 72, and the motor 72 rapidly passes through the low rotation region. As a result, the power consumption of the motor 72 is reduced by multiplying the torque to increase the washing force to the laundry after the start-up and then quickly moving to the high rotation region of the motor. Since the washing machine 1 performs the specific action of forward rotation/backward rotations repeatedly in a short period, the above-described effects are achieved repeatedly. Therefore, even if the motor 72 with a cheap configuration is adopted, an efficient operation similar to that achieved in the case that a frequency converter is adopted can be realized.

Therefore, a so-called V-belt type transmission constructed by connecting a driving side pulley unit and a driven side pulley unit via a driving belt is adopted. However, in order to install such a pulley unit, shafts need to be added to the output shaft 72m and the input shaft 80m, causing an increase in the size of the driving unit. As a result, a distance between the point of action and the fulcrum of the shafts 72m and 80m becomes longer. Thus, the shafts are easily broken, and no matter how the added part of the shafts is fixed stably, a tension still will be applied by the driving belt, thereby inevitably generating noises and abnormal sounds in such a case. In particular, since a square effect occurred for the stress and a cubic effect occurred for the curvature with respect to the length of the shaft, the lengthening of the shaft should be avoided as much as possible. Therefore, the following construction is adopted in the present embodiment: no accessories need to be used in the current output shaft 72m and input shaft 80m, and the pulley units can be easily installed by means of a direct assembly. The construction is described in details below.

The transmission 8 is an automatic transmission that changes the gear ratio in accordance with the rotation speed of the output shaft 72m of the motor 72. Specifically, the transmission 8 includes a transformable driving side pulley unit 81 provided on the output shaft 72m, a transformable driven side pulley unit 82 provided on the input shaft 73m, and a V-type driving belt 83 for transferring power between the pulley units 81, 82. Compared with the structure as shown in FIG. 2, the driving side pulley 81, the driven side pulley 82 and the V-type driving belt 83 are installed in the power transferring part to replace the fixed pulley 72a, the flat driving belt 74 and the fixed pulley 73a.

Regarding the driving side, in the existing structure shown in FIG. 2, the radiating fin 72b, the pulley hub 72c and the pulley 72a are fixed to the output shaft 72m of the motor 72 by a pin 72d. However, in the present embodiment shown in FIG. 1, the driving side pulley unit 81 includes: a driving side movable pulley 81a, which is connected to the output shaft 72m of the motor 72 so that the driving side movable pulley 81a rotates together with the output shaft 72m and moves in an axial direction; a driving side fixed pulley 81b opposed to the driving side movable pulley 81a, the driving side fixed pulley 81b is fixed to the output shaft 72m so that the driving side fixed pulley 81b rotates together with the output shaft 72m and does not move in the axial direction; and a rotation speed sensing part 81c for applying an axial displacement corresponding to the rotation speed of the output shaft 72m to the driving side movable pulley 81a.

Each of opposing surfaces of the driving side movable pulley 81a and the driving side fixed pulley 81b forms an inverted dish shape so that the distance between the opposing surfaces increases as the distance from the center in the radial direction increases.

The rotating speed sensing part 81c is composed of the following components: a speed changing plate 81c1 arranged at a position opposed to the driving side movable pulley 81a and having a supporting surface substantially orthogonal to the output shaft 72m; a weight roller 81c2, which is arranged between the speed changing plate 81c1 and the driving side movable pulley 81a so that the weight roller 81c2 rotates integrally with the speed changing plate 81c1 and the driving side movable pulley 81a and is capable of rotating radially; an inclined surface 81c3 located at the driving side movable pulley 81a side and located at a position additionally provided on the weight roller 81c2, where the inclined surface 81c3 is exerted a force by the weight roller 81c2 toward the driving side fixed pulley 81b as the weight roller 81c2 is away from the center; and an inclined surface 81c4 located on the side of the speed changing plate 81c1 and located at a position additionally provided on the weight roller 81c2, where the inclined surface 81c4 exerts a force to the weight roller 81c2 toward the driving side fixed pulley 81b as the weight roller 81c2 is away from the center. The inclined surface 81c3 is particularly set to have a larger slope as the radical diameter increases. The inclined surface 81c4 at the speed changing plate 81c1 side and the inclined surface 81c3 at the driving side movable pulley 81a side have opposite slopes.

Besides the above components, the driving side pulley unit 81 further includes a radiating fin 81d for cooling the motor 72, a gasket 81e as a buffer member, and the like.

Figure 5:
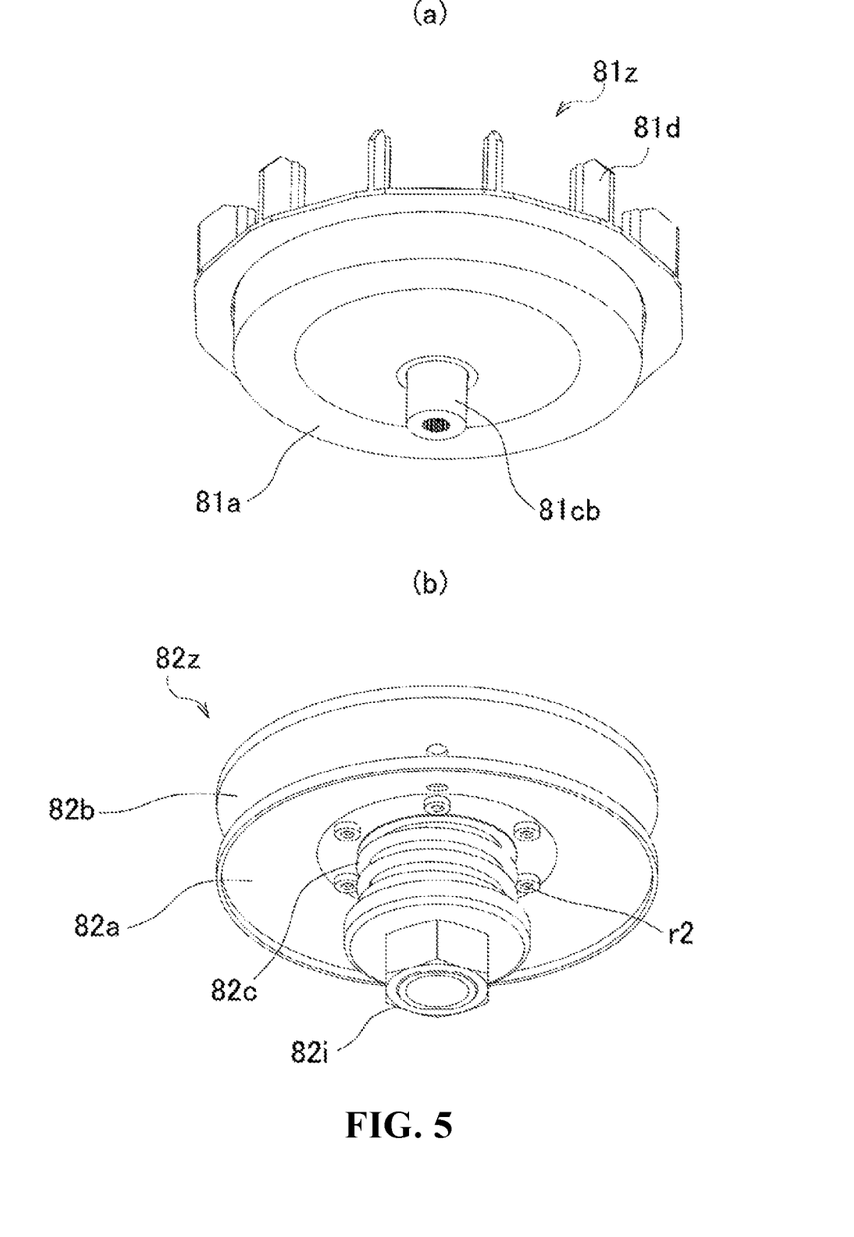
FIG. 5 is a perspective view illustrating a configuration of a driving side pulley unit and a driven side pulley unit in the same embodiment.

Most components of the driving side pulley unit 81 are preassembled to constitute a unit main body 81z shown in FIG. 5(a). Specifically, in the unit main body 81z shown in FIG. 1, FIG. 5(a) and FIG. 6, the radiating fin 81d is fixed to the speed changing plate 81c1 via a screw v1. The hub part 81cb of the speed changing plate 81c1 passes through the movable side driving pulley 81a with the driving pulley 81a being covered by the speed changing plate 81c1. A plurality of weight rollers 81c2 are provided on the movable side driving pulley 81a at equal degree relative to the input shaft 72. The hub 81cb of the speed changing plate 81c1 is fitted and assembled to the outer periphery of the output shaft 72m of the motor 72, and the driving side fixed pulley 81b, the collar 81f and the spring cushion 81g are pressed against the shaft end of the hub 81cb, and further, a hexagon bolt 81h is fixed to a screw hole 72m1 generated by tapping the shaft end face of the output shaft 72m through post-processing, thereby completing the assembly of the unit main body 81z. With such a unitization, it is possible to improve the assembly operability and perform component inspection on the basis of units.

On the other hand, regarding the driven side, compared with the existing structure shown in FIG. 2 in which the pulley 73a is fixed to the output shaft 73m of the rotation body via a nut 73n, the driven side pulley unit 82 according to the present embodiment shown in FIG. 1 includes: a driven side movable pulley 82a, which is connected to the input shaft 80m of the rotation part 80 (i.e. the input shaft 73m of the power distributing part 73) so that the driven side movable pulley 82a rotates along with the input shaft 80m and moves in the axial direction; a driven side fixed pulley 82b, which is opposed to the driven side movable pulley 82a and fixed to the input shaft 73m so that the driven side fixed pulley 82b rotates along with the input shaft 73m and does not move in the axial direction; and a spring 82c for elastically exerting force to the driven side fixed pulley 82b from the driven side movable pulley 82a.

Each of opposing surfaces of the driven side movable pulley 82a and the driven side fixed pulley 82b also forms an inverted dish shape so that the distance between the opposing surfaces increases as the distance from the center in the radial direction increases. A common component is used in the pulleys 82a, 82b, thus a more smooth speed change can be achieved and the production cost is reduced compared with the case of using different components.

Besides the components described above, the driven side pulley unit 82 further includes an inner pulley hub 82d, an outer pulley hub 82e, a cam mechanism 82f, and the like.

Figure 6:
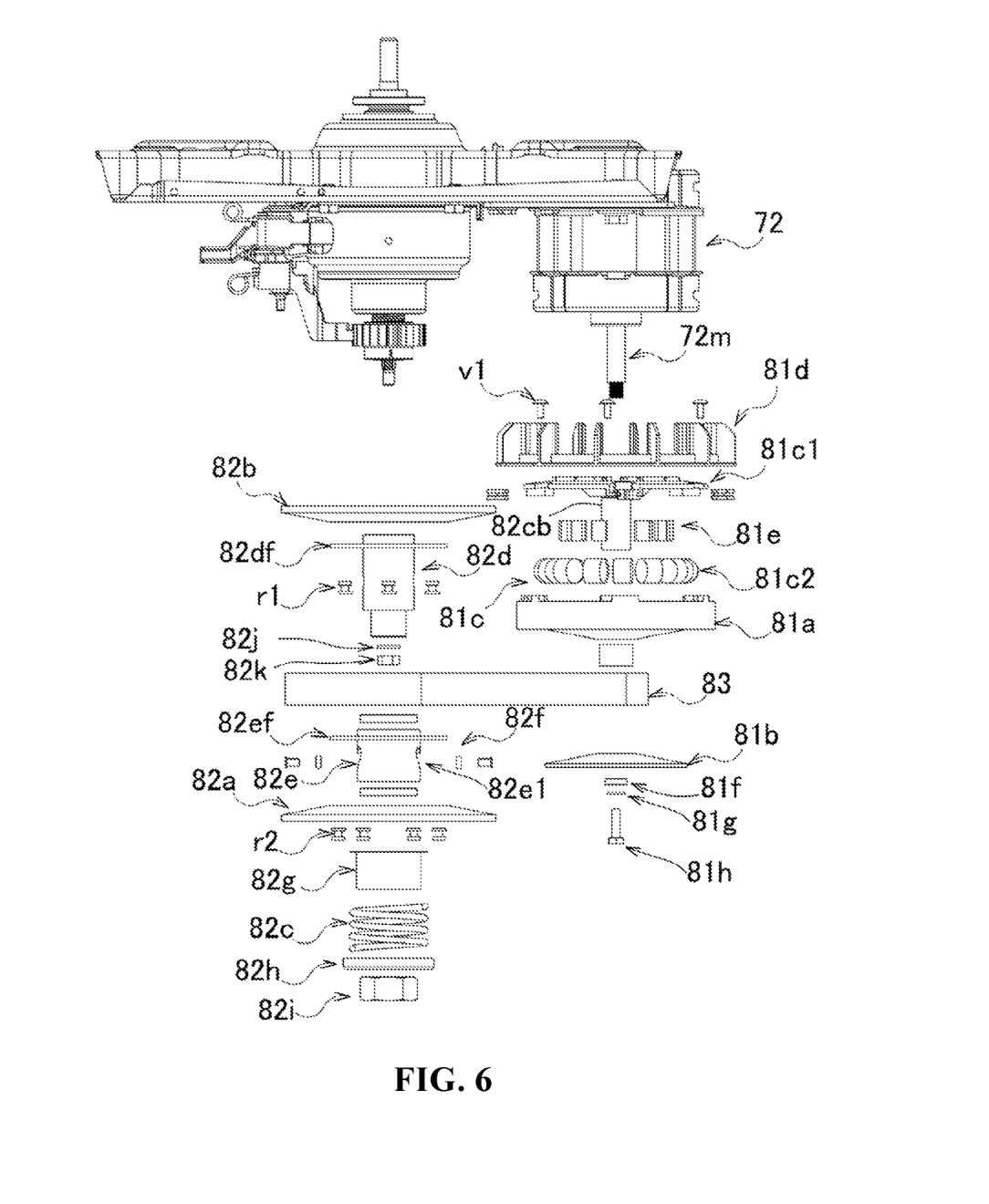
FIG. 6 is an exploded view of the transmission adopted in the same embodiment before the transmission is assembled.

Most components of the driven side pulley unit 82 are also preassembled to constitute a unit main body 82z shown in FIG. 5(b). Specifically, as shown in FIG. 1, FIG. 5(b), and FIG. 6, a flange 82df of the bottomed inner pulley hub 82d is fixed to the driven side fixed pulley 82b via a rivet r1, and a flange 82ef of the outer pulley hub 82e is fixed to the driven side movable pulley 82a via a rivet r2, and the outer pulley hub 82e is fitted to the outer periphery of the inner pulley hub 82d to further fit with the spring 82c and a driven pulley fixing plate 82h served as a retainer of the spring. A nut 82i is fastened to the shaft end of the inner pulley hub 82d when the unit main body 82z is the above state. The cam mechanism 82f is configured by fixing a pin inserted into a cam groove 82e1 provided on the outer periphery of the outer pulley hub 82e to the outer periphery of the inner pulley hub 82d. The unit main body 82z is assembled to the input shaft 80m of the rotation part 80 after penetrating the bottom part of the inner pulley hub 82d, and is fastened to an inner surface of the bottom part of the inner pulley hub 82d at one side of the hollow part by a nut 82k via a spring washer 82j so that the assembly of the unit main body 82z is completed. Here, by means of the unitization, the assembly operability can be improved, and the component inspection is performed on the basis of units.

The V-type driving belt 83 is formed in a crawler shape with glass fibers, KEVLAR fibers and the like, which are excellent in heat resistance, abrasion resistance and the like, and is provided with a plurality of teeth at the inner circumferential surface.

The V-type driving belt 83 can be wound to the driven side pulley unit 82 before or after being assembled to the input shaft 80m.

On the other hand, as for the driving side pulley unit 81, the driving side fixed pulley 81b is mounted after the unit body 81z is assembled to the output shaft 72m of the motor 72 and the V-type driving belt 83 is wound.

As described above, for the components requiring to rotate integrally with the output shaft 72m and the input shaft 80m, a spline stopper, a D-shaped shaft stopper and a pin stopper are suitably utilized between the components and the output shaft 72m, between the components and the input shaft 80m, or among the components.

As described above, at the driving side, the driving side fixed pulley 81b is pressed against the end of the output shaft 72m, and the hexagonal bolt 81h passing through the fixed pulley 81b is fastened to the screw hole 72m1 formed by tapping the shaft end face of the output shaft 72m. Thus, the fixed pulley 81b is installed on the existing output shaft 72m without changing the length and the diameter, and no shaft is added. Further, the input side is provided with the outer pulley hub 82e which rotates integrally with the driven side movable pulley 82a, the inner pulley hub 82d which rotates integrally with the driven side fixed pulley 82b, and the cam mechanism 82f formed between the pulley hubs 82e and 82d. The inner pulley hub 82d is made to have a bottom, and the shaft end of the input shaft 80m penetrating through the bottom and the inner pulley hub 82d are fastened to the inner surface of the bottom. As a result, the outer pulley hub and the inner pulley hub are installed on the existing input shaft 80m without changing the length and the diameter, and no shaft is added.

That is, the pulley unit 81 can be directly installed on the output shaft 72m with the output shaft 72m being positioned between the movable pulley 81a and the fixed pulley 81b constituting the pulley unit 81 so that the pulley unit 81 rotates integrally with the output shaft 72m. The pulley unit 82 can be directly installed on the input shaft 80m with the input shaft 80m being positioned between the movable pulley 82a and the fixed pulley 82b constituting the pulley unit 82 so that the pulley unit 82 rotates integrally with the input shaft 80m. Therefore, the pulley units 81 and 82 can be installed without adding shafts to the output shaft 72m and the input shaft 80m. As a result, the enlargement due to the increase in the size of the shaft can be avoided effectively, and based on that, the generation of the noises or the abnormal sounds and the fragility of the shaft can be effectively avoided. The output shaft 72m and the input shaft 80m can be directly used without changing the length and the diameter. Therefore, the operability of the safe operation can be improved, the cost is greatly reduced, and extra bearings or the like are avoided.

Figure 4:
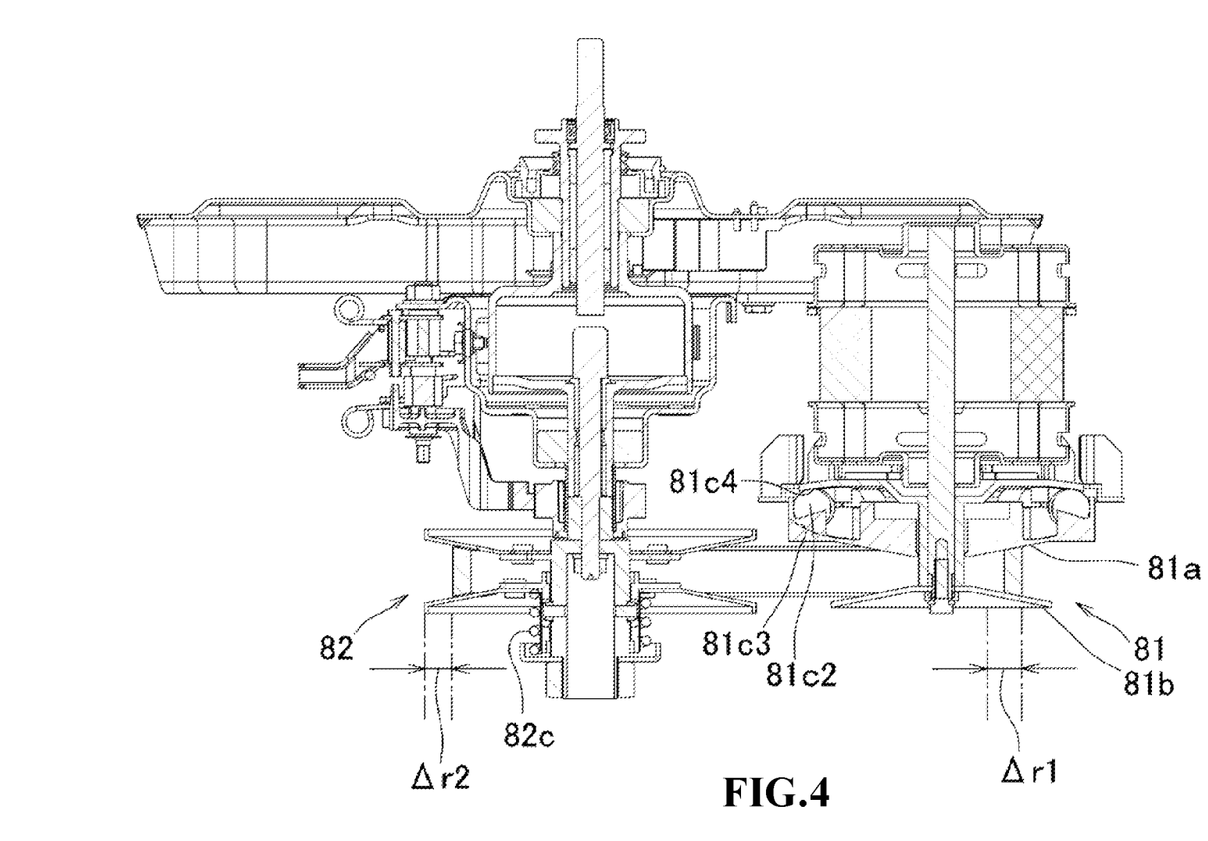
FIG. 4 is a view illustrating a state where the transmission adopted is started in the same embodiment.

FIG. 1 shows a state before the motor is started. FIG. 4 shows a state after the motor is started. The driven side movable pulley 82a is originally in a state shown in FIG. 1 in which the driven side movable pulley 82a is exerted a force by the spring 82c and the distance relative to the driven side fixed pulley 82b is shortened. The pulley diameter of the driven side pulley unit 82 clamped by the V-type driving belt 83 is substantially increased. Since the opposed driving side movable pulley 81a does not exert centrifugal force, the weight roller 81c2 is located at a radially inner side position near the output shaft 72m, the V type driving belt 83 is in a state of being pulled to the driven side pulley unit 82 side to increase the distance relative to the driving side fixed pulley 81b, and the pulley diameter of the driving side pulley unit 81 clamped by the V type driving belt 83 is substantially decreased. FIG. 7(a) shows a state in which the weight roller 81c2 is located at a radially inner side position X1 (see the reference numeral placed within the parentheses).

When the motor 72 is started under the state, through the rotation of the driving side movable pulley 81a, the weight roller 81c2 moves to an outer circumferential side as shown in FIG. 1 to FIG. 4 due to the centrifugal force; and the driving side movable pulley 81a is pressed to the weight roller 81c2 via the inclined surfaces 81c3, 81c4 so as to move toward the driving side fixed pulley 81b. As a result, the distance between the driving side movable pulley 81a and the driving side fixed pulley 81b is decreased, so that the substantial pulley diameter of the driving side pulley unit 81 is increased by Δr1 relative to the V-type driving belt 83. Next, the V-type driving belt 83 is pulled to the driving side pulley unit 81 side, and the driven side movable pulley 82a resists elastic force of the spring 82c to move so that the distance relative to the driven side fixed pulley 82b is increased like FIG. 1 to FIG. 4. Therefore, the substantial pulley diameter is decreased by Δr2 relative to the V-type driving belt 83. FIG. 7(b) shows a state in which the weight roller 81c2 has reached a radially outer side position X2 (see the reference numerals placed within the parentheses).

The movable range of the weight roller 81c2 is set between an upright wall 81a1 at the inner peripheral side and an upright wall 81a2 at the outer peripheral side of the driving side movable pulley 81a. The pulley diameter ratio (i.e., the reduction gear ratio) varies linearly during the range.

Figure 7:
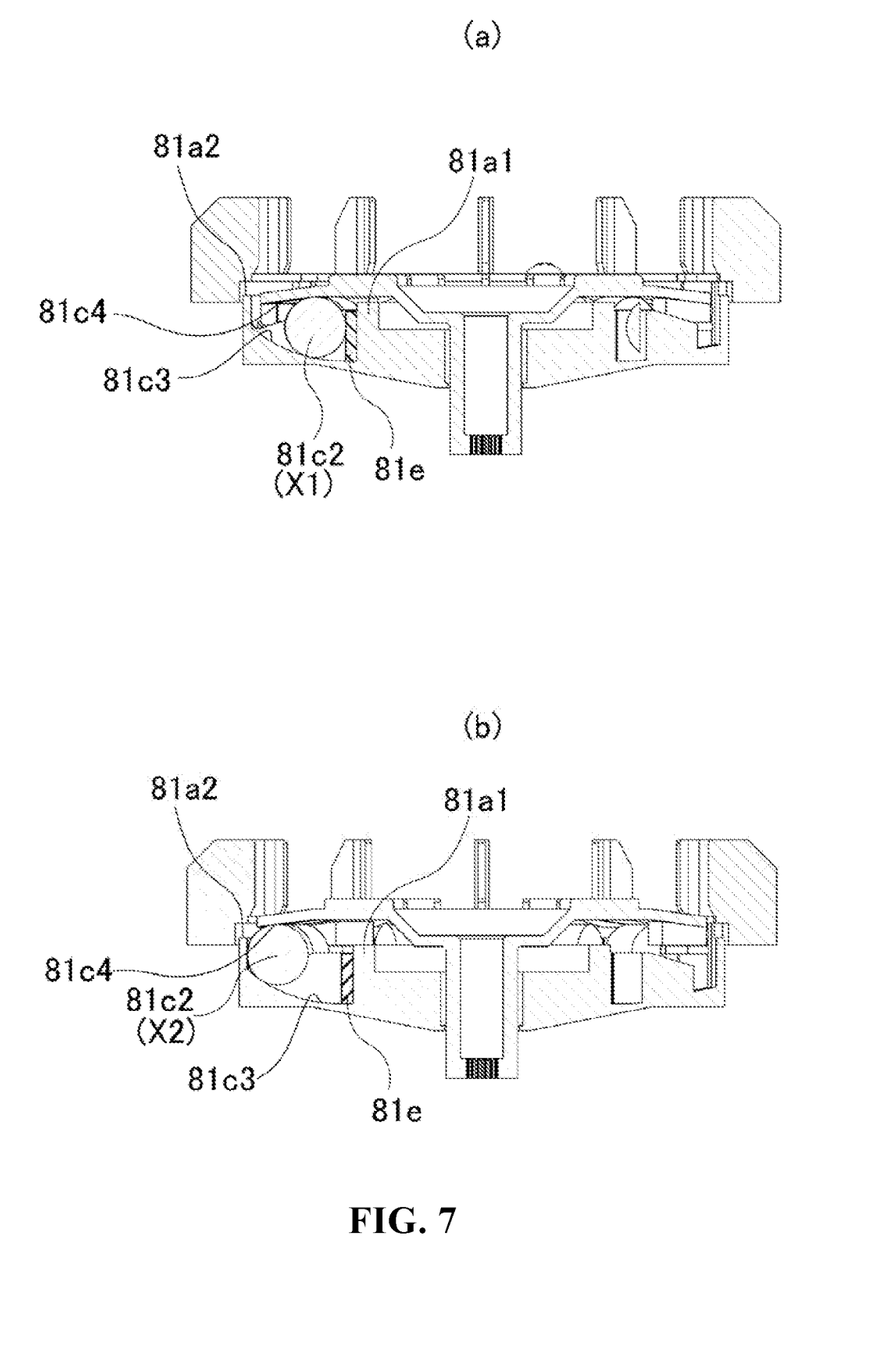
FIG. 7 is a sectional view illustrating a configuration of a rotation speed sensing part in the same embodiment.

As will be described later, the motor is repeatedly energized/deenergized at a constant period in the washing machine, so that the motor is repeatedly started in a backward direction after the rotation part stops. Thus, for the transmission itself, the weight roller 81c2 for sensing the rotation speed also collides with the upright wall 81a1 at the inner peripheral side and the upright wall 81a2 at the outer peripheral side, and at this time, the impact noise becomes the reason for which the jarring noise or the abnormal noise is generated. In particular, in the present embodiment, the following structure is adopted: when the weight roller 81c2 shifts due to the centrifugal force, the movable pulley 82a at a side where the weight roller 81c2 side is not provided (i.e., the driven side) compresses the spring 82c as it shifts in the axial direction. Therefore, when the weight roller 81c2 moves to the radially outer side position X2 (see FIG. 7 (b)) as the rotation speed increases, the weight roller 81c2 moves against the elastic force of the spring 82c. As a result, although the impact at the radially outer side position X2 is small, the elastic force of the spring 82c is also applied and a large impact is generated when the motor is deenergized or when the weight roller 81c2 returns to the radially inner side position X1 (see FIG. 7 (a)). Therefore, at the outer peripheral surface of the upright wall 81a1 at the inner peripheral side located radially inner side position of the inclined surface 81c3, the gasket 81e made of a rubber sheet such as NBR is disposed as an interference member at a circumferentially diagonal position corresponding to each weight roller 81c2, so as to reduce the impact noise generated after the weight roller 81c2 returns to the radially inner side position.

Figure 3:
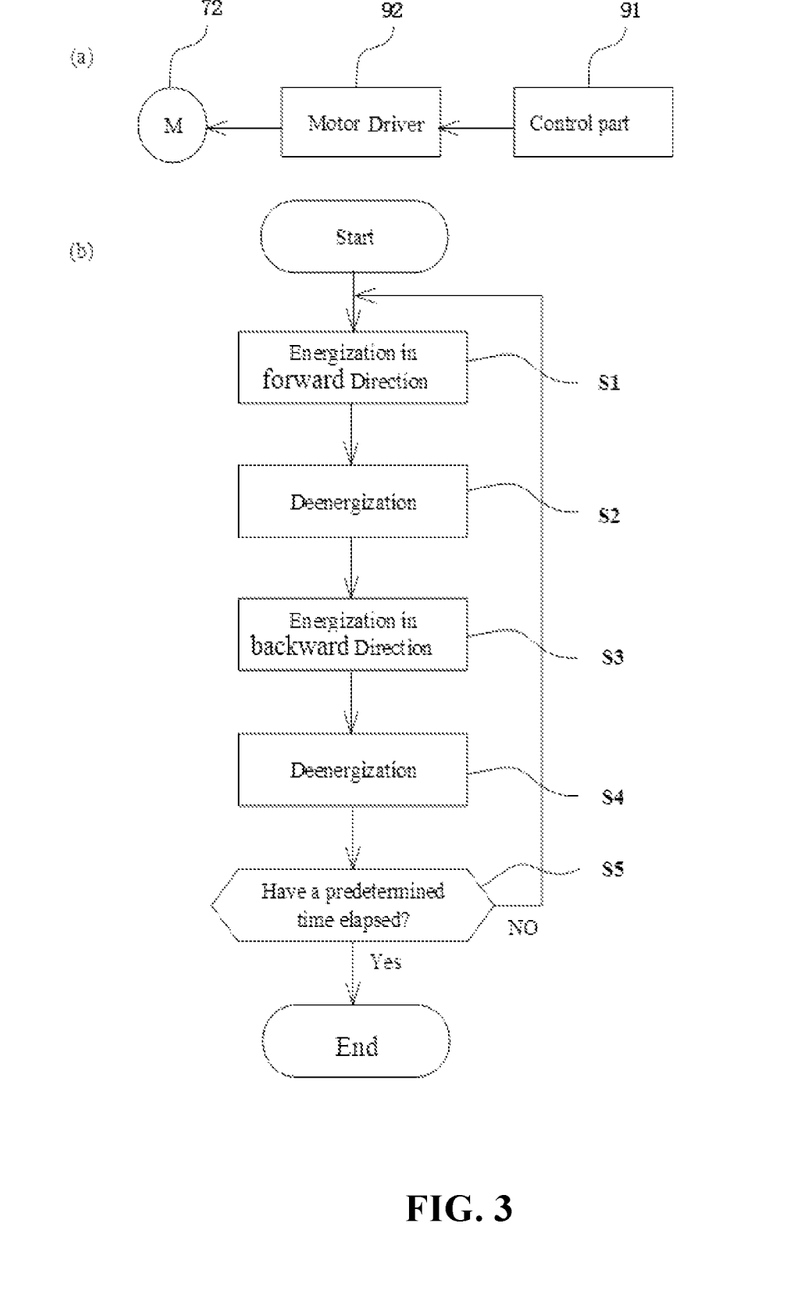
FIG. 3 is a view illustrating a control system of a motor in the same embodiment.

On the other hand, as shown in FIG. 3(a), the motor 72 is configured to be controlled by a control unit 91 via a motor driver 92. The control part 91 is, for example, a microcomputer for controlling all washing programs of the washing machine 1, and is used for switching the energizing/deenergizing of the motor 72. FIG. 3(b) illustrates a flow stored in the control part 91, and is a flow chart illustrating a summary of energizing control for the motor 72 in the washing process.

Firstly, the motor 72 is energized in a forward direction in step S1. After a specified driving time T1 elapsed since the energizing, the motor 72 is deenergized in step S2. Next, after a specified inertial rotation time T2 elapsed since the deenergizing, the motor 72 is energized in a backward direction in step S3. After a specified driving time T3 elapsed since the energizing, the motor 72 is deenergized in step S4. Then, after a specified inertial rotation time T4 elapsed since the deenergizing, the flow proceeds to step S5. In step S5, it is determined whether a specified process execution time T5 set for the washing process elapses since the beginning of the washing process (i.e., since the energizing in initial step S1). If the determination result is "not", the flow returns to step S1; and if the determination result is "yes", the flow is ended.

In other words, by taking the specified driving time T1 (T3) for the rotation part 80 and the specified inertial rotation time T2 (T4) until the rotation part 80 stops (i.e., until the stirring wing 63 stops) as working units, the backward driving of the rotation part 80 is controlled repeatedly on the basis of each working unit.

In the present embodiment, the driving times T1, T3 are set as 1.3 seconds; the inertial rotation times T2, T4 are set as 1.5 seconds; and the process execution time T5 is set as 6 minutes. In contrast, in the situation of not adopting the structure of the transmission 8 in FIG. 2, the driving times T1, T3 are set as 1.3 seconds, the inertial rotation times T2, T4 are set as 0.5 second, and the process execution time T5 is set as 4 minutes. The reason for which the driving times T1 and T3 are set to be the same and the inertia rotation times T2 and T4 are set to be longer is to cope with the case where the inertia weight increases as the transmission 8 is added, so that after the motor 72 starts, the time required from the deenergizaiton to the stop of the motor 72 after the startup is prolonged.

That is, in the structure of FIG. 1, when the motor rotates in the backward direction with the inertia rotation time of T2, T4=0.5 second, which is the same as that of the fixed type pulleys 72a, 73a, the motor rotates in the backward direction during the inertia rotation, and the noise and the abnormal noise generated due to the sliding friction of the driving belt and the pulley become larger. However, when the inertia rotation times T2 and T4 are set as 1.5 seconds and the motor rotates in the backward direction after the rotation is stopped, it is possible to inhibit the noises and the abnormal noises due to the sliding friction as much as possible. Of course, if the motor rotates in the backward direction during the inertial rotation, the power is consumed. On the contrary, if the motor rotates in the backward direction after the rotation is stopped, the inertial rotation can be effectively utilized, and the washing performance can be improved without consuming electricity.

As described above, according to the present embodiment, the pulley units 81 and 82 can be installed without adding shafts to the input shaft 72m and the output shaft 80m. On the basis of avoiding the enlargement of the shaft due to an increase on the size of the shaft, the transmission 8 is suitably added to effectively avoid the occurrences of harsh noise and abnormal noises and the fragility of the shaft.

As mentioned above, an embodiment of this disclosure is described, but the specific structure of each part is not limited to the above-mentioned embodiment.

For example, although a gasket served as a buffer member is provided at a radially inner side position of the weight roller in the embodiment described above, it may be provided at the radially outer side position.

In addition, although the induction motor is used as the motor in the embodiment described above, the same functional effect can be generated when the transmission is adopted even if a motor other than an induction motor is used.

In addition, the movable weight may be a ball or a sliding block.

Other structures may be modified without departing from the scope of the technical spirit of the present disclosure.

What is claimed is:

1. A washing machine, comprising:
   an input shaft, configured to supply a rotary power to a rotation part for rotating washings;
   a motor, configured to rotate in a forward direction and a backward direction and served as a power source of the rotation part; and
   a transmission arranged between an output shaft of the motor and the input shaft of the rotation part, wherein the transmission comprises a transformable driving side pulley unit disposed on the output shaft;
   a transformable driven side pulley unit disposed on the input shaft; and
   a driving belt for transferring power between the driving side pulley unit and the driven side pulley unit, wherein the driving side pulley unit is directly installed on the output shaft by locating one end of the output shaft at a movable pulley and a fixed pulley constituting the driving side pulley unit respectively, so that the driving side pulley unit rotates integrally with the output shaft, and the driven side pulley unit is directly installed on the input shaft by locating one end of the input shaft at a movable pulley and a fixed pulley constituting the driven side pulley unit respectively, so that the driven side pulley unit rotates integrally with the input shaft.

2. The washing machine according to claim 1, wherein the driven side pulley unit comprises an outer pulley hub rotating integrally with the movable pulley, an inner pulley hub rotating integrally with the fixed pulley, and a cam mechanism formed between the outer pulley hub and the inner pulley hub, wherein the inner pulley hub is formed to have a bottom, and the end of the input shaft penetrating through the bottom is fastened to an inner surface of the bottom of the inner pulley hub.

3. The washing machine according to claim 2, further comprising a control part for driving the motor via a driver, wherein the control part is configured to, by taking a preset specified driving time during which the rotation part is driven and a specified inertial rotation time until the rotation part stops as working units, drive the rotation part in the backward direction repeatedly on the basis of each of the working units.

4. The washing machine according to claim 1, wherein the transmission comprises a rotation speed sensing part configured to change a pulley diameter ratio according to a rotation speed of the output shaft or the input shaft, wherein the rotation speed sensing part comprises:
   a movable weight that moves from a radially inner side position to a radially outer side position due to a centrifugal force; and
   an inclined surface provided on a side of the movable pulley, wherein the inclined surface is configured to convert a displacement of the movable weight into an axial displacement of the movable pulley, and a buffer member for cushioning an impact generated when the movable weight collides with the inclined surface is provided at a radially inner side position or a radially outer side position of the inclined surface.

5. The washing machine according to claim 4, wherein the washing machine is configured as follows: after the movable weight shifts due to the centrifugal force, the movable pulley located at a side where no movable weight is provided compresses a spring as the movable pulley shifts in an axial direction, and the buffer member is provided at least at the radially inner side position of the inclined surface to cushion an impact when the movable weight returns.

6. The washing machine according to claim 5, further comprising a control part for driving the motor via a driver, wherein the control part is configured to, by taking a preset specified driving time during which the rotation part is driven and a specified inertial rotation time until the rotation part stops as working units, drive the rotation part in the backward direction repeatedly on the basis of each of the working units.

7. The washing machine according to claim 4, further comprising a control part for driving the motor via a driver, wherein the control part is configured to, by taking a preset specified driving time during which the rotation part is driven and a specified inertial rotation time until the rotation part stops as working units, drive the rotation part in the backward direction repeatedly on the basis of each of the working units.

8. The washing machine according to claim 1, further comprising a control part for driving the motor via a driver, wherein the control part is configured to, by taking a preset specified driving time during which the rotation part is driven and a specified inertial rotation time until the rotation part stops as working units, drive the rotation part in the backward direction repeatedly on the basis of each of the working units.

* * * * *